United States Patent [19]

Lerch et al.

[11] Patent Number: 5,421,878
[45] Date of Patent: Jun. 6, 1995

[54] PURE-COLORED IRON OXIDE DIRECT RED PIGMENTS, A PROCESS FOR THEIR PRODUCTION AND THEIR USE

[75] Inventors: Klaus Lerch; Gunter Buxbaum, both of Krefeld, Germany

[73] Assignee: Bayer AG, Leverkusen, Germany

[21] Appl. No.: 217,191

[22] Filed: Mar. 24, 1994

Related U.S. Application Data

[63] Continuation-in-part of Ser. No. 134,654, Oct. 12, 1993, abandoned, and Ser. No. 133,895, Oct. 12, 1993, abandoned.

[30] Foreign Application Priority Data

Oct. 23, 1992 [DE] Germany .......................... 42 35 947.3
Oct. 23, 1992 [DE] Germany .......................... 42 35 944.9

[51] Int. Cl.$^6$ ............................................. C09C 1/22
[52] U.S. Cl. ................................. 106/456; 106/903; 423/633
[58] Field of Search ................ 106/456, 903; 423/632, 423/633

[56] References Cited

U.S. PATENT DOCUMENTS

| | | | |
|---|---|---|---|
| 2,716,595 | 8/1955 | Marsh ..................................... | 23/200 |
| 3,946,103 | 3/1976 | Hund ..................................... | 423/633 |
| 4,234,348 | 11/1980 | Brunn et al. ........................ | 106/304 |
| 4,404,254 | 9/1983 | Franz et al. ........................ | 423/633 |
| 4,676,838 | 6/1987 | Franz et al. ........................ | 106/304 |
| 4,753,680 | 6/1988 | Burow et al. ........................ | 106/304 |

FOREIGN PATENT DOCUMENTS

1084405  9/1953  Germany.
1554456  10/1979  United Kingdom.

OTHER PUBLICATIONS

Draft International Standard ISO/DIS 9277, International Organization for Standardization, 1992, Determination of the Specific Surface Area of Solids by Gas Adsorption Using the BET Method, pp. 1–13 no month.
DIN 6174, Deutsche Normen, Jan. 1979, Farbmetrische Bestimmung von Farbabständen bei Körperfarben nach der CIELAB–Formel, pp. 1–2.
DIN 53237, Deutsche Normen, Feb. 1977, Pigmente zum Einfärben von zement–und kalkgebundenen Baustoffen, pp. 1–5.
DIN 66131, Deutsche Normen, Oct. 1973, Bestimmung der spezifischen Oberfläche von Feststoffen durch Gas adsorption nach Brunauer, Emmett und Teller (BET) Grundlagen, pp. 1–7.
DIN 66131, Deutsche Norm, Jul. 1993, Bestimmung der spezifischen Oberfläche von Feststoffen durch Gas adsorption nach Brunauer, Emmett und Teller (BET), pp. 1–5.
International Standard, ISO 7724/3, Paints and varnishes—Colorimetry—Part 3: Calculation of colour differences, pp. 1–3, (1984), no month.
Lewis, Pigment Handbook, vol. 1, Properties and Economics, Second Edition, pp. 288–289 (date unknown).

*Primary Examiner*—Mark L. Bell
*Assistant Examiner*—Michael Marcheschi
*Attorney, Agent, or Firm*—Connolly and Hutz

[57] ABSTRACT

This invention relates to new pure-colored iron oxide direct red pigments, to a process for their production and to their use for pigmenting lacquers, plastics, building materials and ceramics.

20 Claims, 4 Drawing Sheets

5,421,878

PURE-COLORED IRON OXIDE DIRECT RED PIGMENTS, A PROCESS FOR THEIR PRODUCTION AND THEIR USE

Cross-Reference to Related Applications

This application is a continuation-in-part of U.S. patent application Ser. No. 08/134,654, filed on Oct. 12, 1993, now abandoned, and U.S. patent application Ser. No. 08/133,895, filed on Oct. 12, 1993 now abandoned, both in the names of Klaus Lerch et al. The entire disclosures of both of the above-identified patent applications is expressly incorporated herein by reference.

BACKGROUND OF THE INVENTION

1. Field of the Invention

This invention relates to new pure-colored iron oxide direct red pigments, to a process for their production and to their use for pigmenting lacquers, plastics, building materials and ceramics.

2. Description of the Prior Art

There are four known processes for the production of red iron oxide pigments (T. C. Patton, Pigment Handbook, Vol. 1, New York 1988, page 288). One of these methods is the direct precipitation of red iron oxides which is described in U.S. Pat. No. 2,716,595. In this method, an iron(II) salt solution and an alkali solution are mixed in substantially equivalent quantities and air is passed through the iron(II) hydroxide or carbonate suspension obtained. The iron(III) oxide hydroxide seed suspension thus formed is made up into the red pigment in the presence of iron(II) salt by addition of metallic iron, heating and oxidation with oxygen-containing gases.

It is known from DE-B 1 084 405 that red pigments can only be produced from red seed suspensions and yellow pigments from yellow seed suspensions. Accordingly, the color of the end product is clearly determined by the seeds used.

Mixtures of yellow and red iron oxide pigments only give brown and unattractive color tones. U.S. Pat. No. 3,946,103 discloses a process using seed modifiers which enables pure red seed suspensions consisting of fine delta-FeOOH particles to be produced.

By virtue of their softness, the pigments produced by this method show improved properties in regard to dispersibility, gloss and flocculation behavior, particularly when used in lacquer systems, by comparison with the pigments produced by calcination of yellow and black iron oxides. In lacquer applications, however, the color purity of the iron oxide red pigments produced by direct precipitation in accordance with U.S. Pat. No. 3,946,103 does not approach that of the red pigments produced by calcination of black and yellow iron oxides.

Moreover, the pigments produced from those seed suspensions show inadequate purity of color so that the pure-colored aesthetic brick red tones required by the market for building materials cannot be achieved.

Accordingly, the problem addressed by the present invention was to provide improved iron oxide direct red pigments which would have the outstanding performance properties described above, but not the disadvantage of inadequate color purity.

Moreover, another problem addressed by the present invention was to provide improved iron oxide direct red pigments which would lead to pure-colored aesthetic brick red tones in building materials.

SUMMARY OF THE INVENTION AND PREFERRED EMBODIMENTS

It has now surprisingly been found that these requirements are satisfied by new iron oxide direct red pigments which are not produced in the usual way from red seed suspensions, but instead from yellow seed suspensions, and which have a color saturation of more than 45 CIELAB units in the building materials test and a color saturation (C*) of more than 37.5 CIELAB units in the lacquer test.

Figure 1:
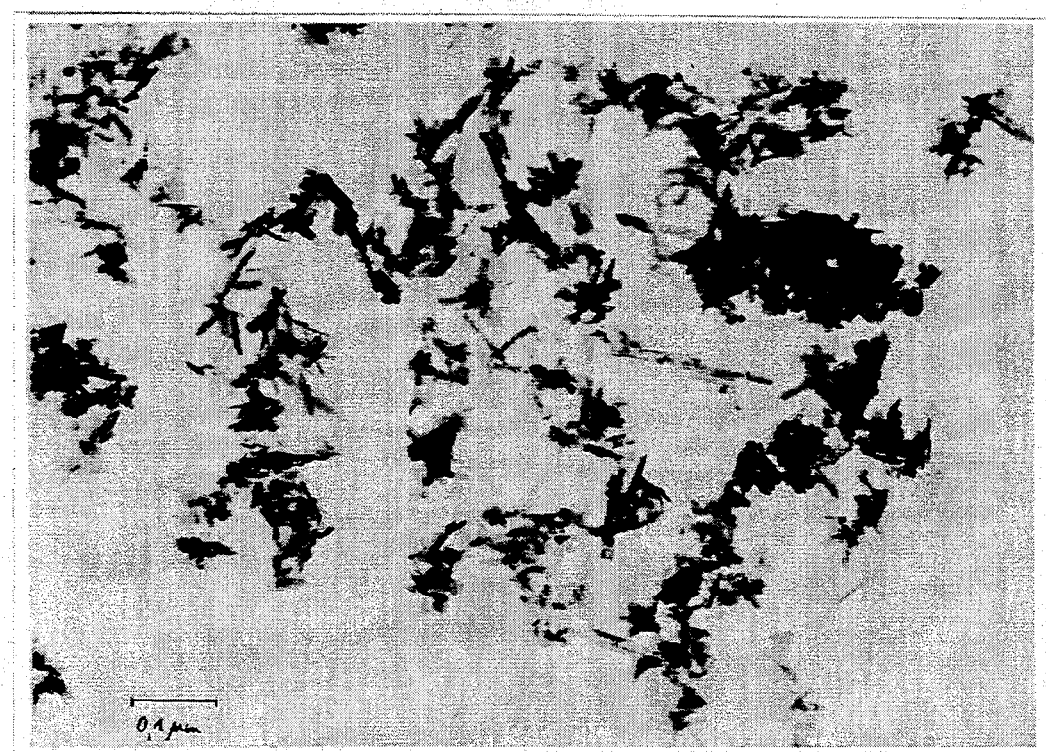
FIG. 1 shows an iron oxide seed (goethite) produced by the process according to the invention which, in the pigment synthesis process, leads to a pure-color red pigment. For comparison.

The present invention relates to iron oxide direct red pigments, characterized in that: (1) they have a color saturation in the building materials test of more than 45 and preferably more than 45.8 CIELAB units; and (2) they have a color saturation (C*) in the lacquer test of more than 37.5 and preferably more than 38.9 CIELAB units.

In the lacquer test, the pigments according to the invention have higher color saturations than the hitherto known direct red pigments (Bayferrox 510 ® produced in accordance with U.S. Pat. No. 3,946,103 or Pfizer Croma Red RO 3097 ®) and the red pigments obtained by calcination of black pigments (produced, for example, in accordance with DE-A 2 826 941) (Bayferrox 105M ®).

Particularly high red components (a*) were obtained in the lacquer test, leading to an aesthetically impressive pure color impression.

In one particularly preferred embodiment, the pigments according to the invention are characterized in that, in the building materials test, the red component (a*) is more than 28 and the yellow component (b*) more than 29 CIELAB units.

In another particularly preferred embodiment, the iron oxide direct red pigments according to the invention are characterized in that, in the lacquer test, the red component (a*) is more than 27.5 and the yellow component (b*) more than 23 CIELAB units.

The iron oxide direct red pigments according to the invention are obtainable by preparation of a yellow goethite seed suspension (alpha-FeOOH), addition of iron(II) salt solution and metallic iron or addition of iron(II) salt solution and alkali solution, heating and oxidation with oxygen-containing gases.

It must be regarded as surprising that pure-colored iron oxide red pigments can be obtained by this process because, according to the prior art, only yellow iron oxide pigments can be produced from yellow seed suspensions.

Accordingly, the present invention relates to a process for the production of pure-colored saturated iron oxide direct red pigments by precipitation of iron(II) salts with an alkali solution and oxidation with oxygen-containing gases, addition of iron(II) salt solution and metallic iron or iron(II) salt solution and an alkali solution to a seed suspension and oxidation with oxygen-containing gases until the required color tone is obtained, wherein a yellow goethite seed suspension consisting essentially of stellately branched particles having a specific surface of greater than 100 m$^2$/g and an average particle size of less than 0.2 μm is used as the seed suspension for synthesis of the pigment.

The BET surface is determined by the nitrogen one-point method (DIN 66 131) while particle size is determined from electron micrographs.

It is possible in the process according to the invention either directly to prepare the seed suspension in the suspension by establishing suitable conditions or to use separately prepared seeds.

The particles of the seed suspensions used in the process according to the invention differ totally in shape from the conventional seeds used for the production of iron oxide yellow pigments.

Figure 2:
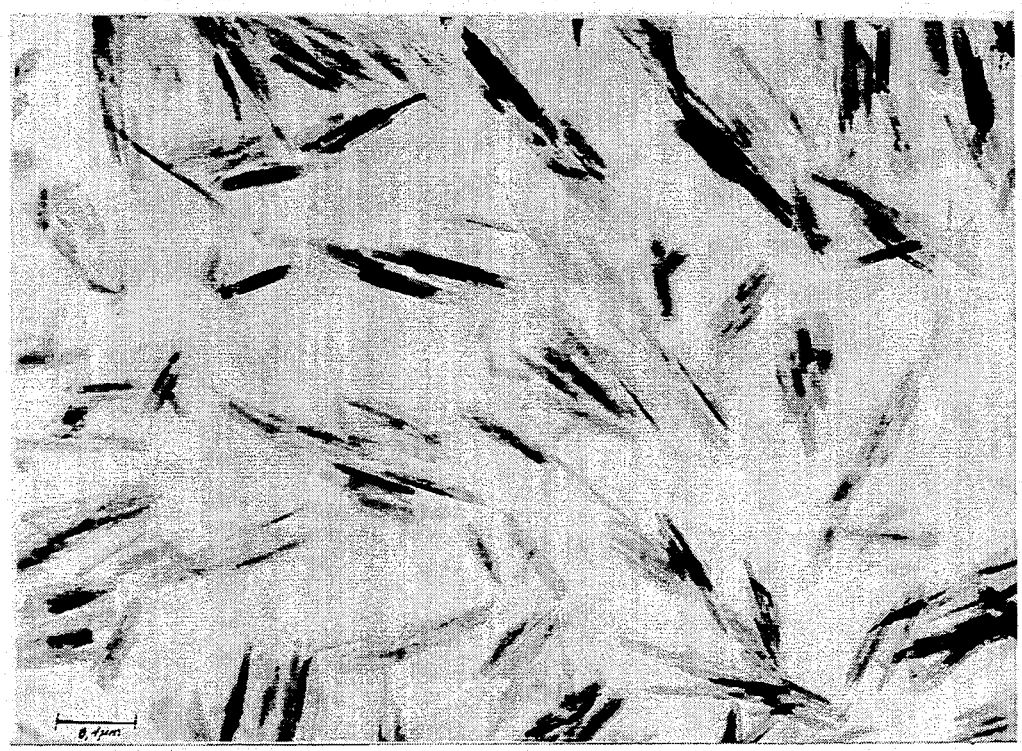
FIG. 2 shows a conventional yellow iron oxide seed (goethite) which leads to a yellow pigment in the pigment synthesis process.
Figure 3:
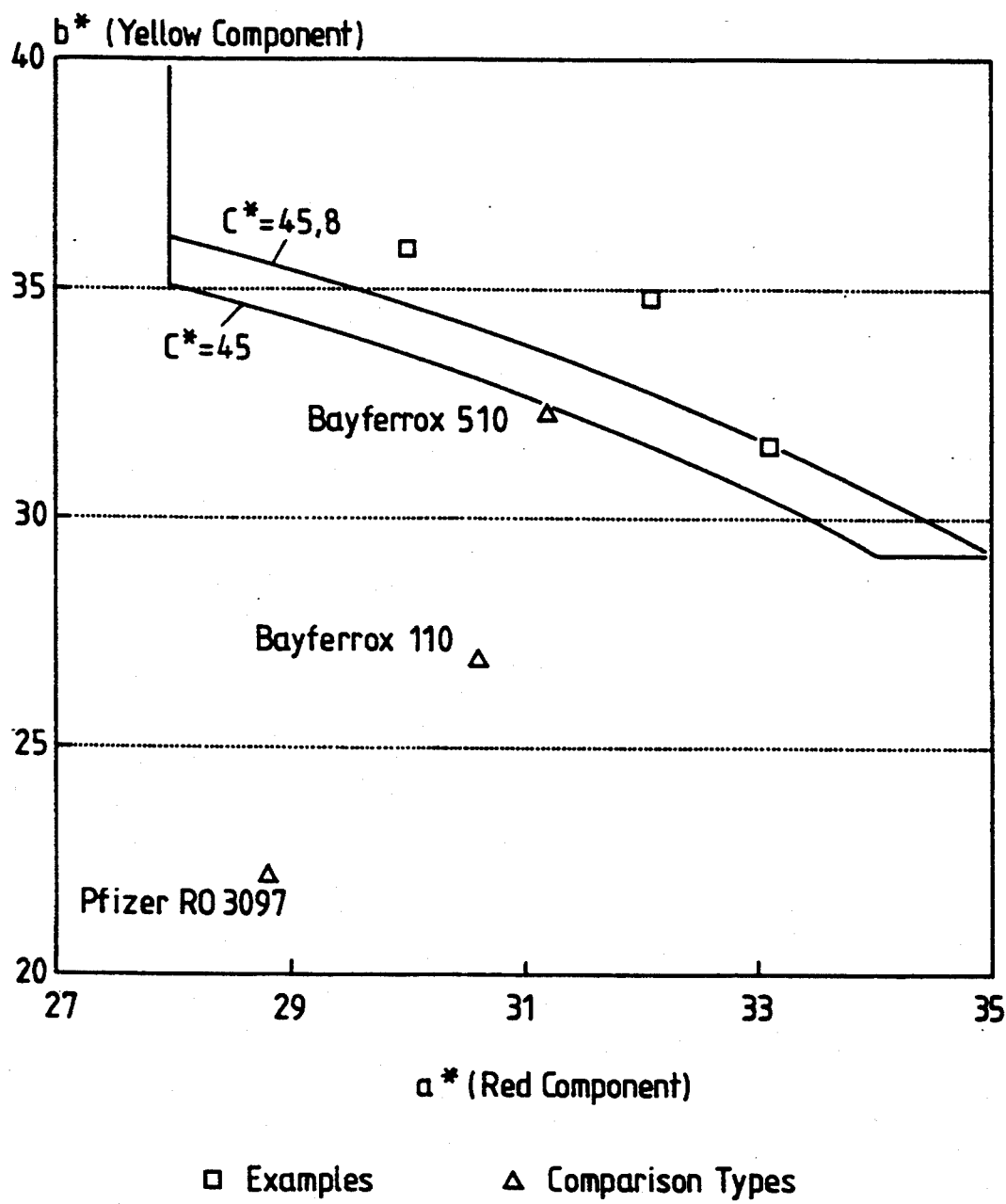
FIG. 3 shows the CIELAB data of some iron oxide red pigments in the building materials test (i.e., lightening in heavy spar; plotted in the a*-b* plane).
Figure 4:
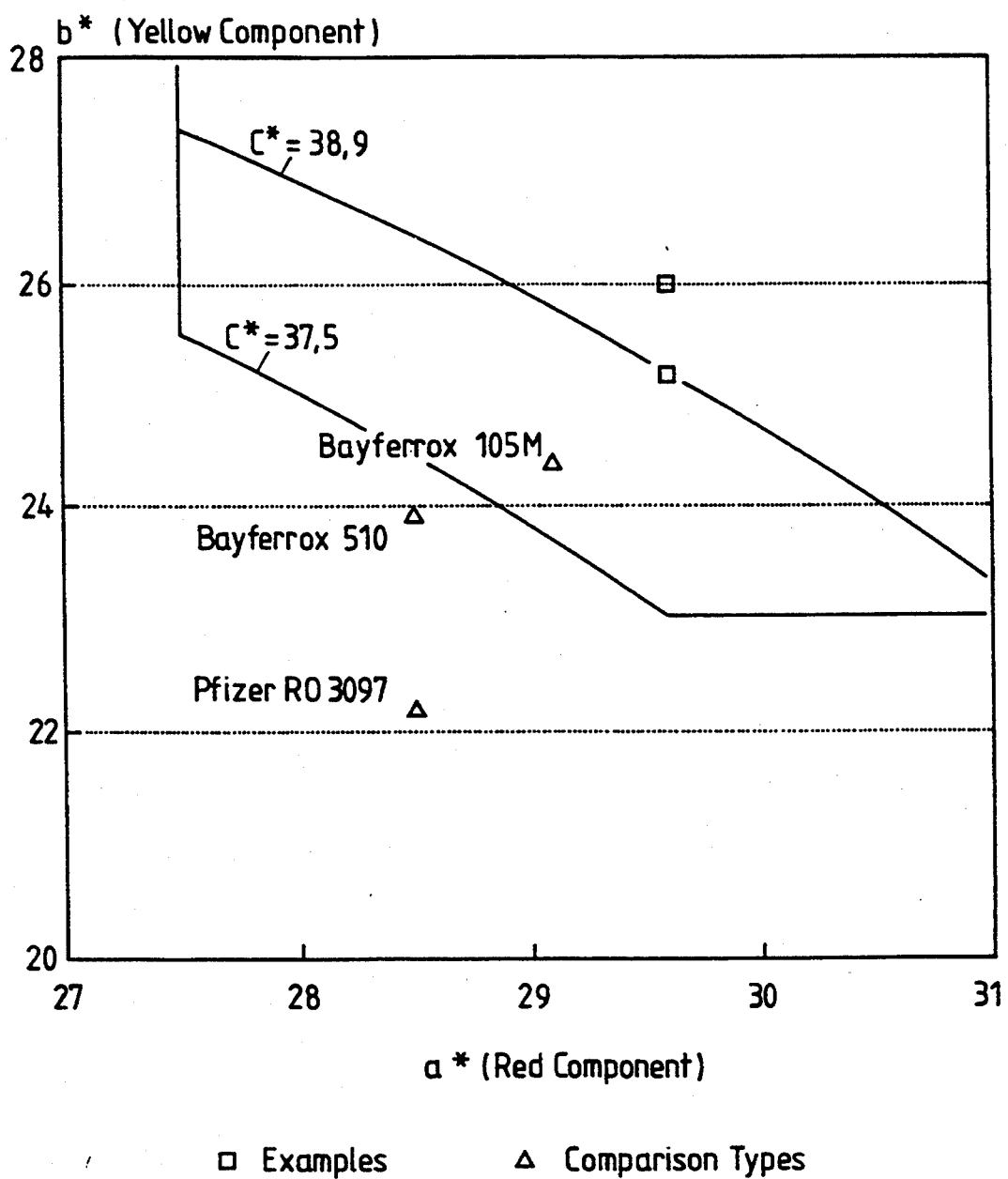
FIG. 4 shows the CIELAB data of some iron oxide red pigments in the lacquer test (i.e., pure colour in Alkydal L64; plotted in the a*-b* plane).

FIG. 1 shows the typical stellate branches of the goethite seeds used in the process according to the invention. For comparison, FIG. 2 shows a conventional yellow seed which consists of unbranched acicular individual particles and, in the pigment synthesis process, leads to a yellow iron oxide pigment.

The yellow geothite seed suspension (alpha FeOOH) is prepared by precipitation of iron(II) salts with an alkali solution followed by oxidation with oxygen-containing gases.

In one preferred embodiment of the process according to the invention, the seed suspension is prepared by
a) forming an aqueous iron(II) sulfate solution having a concentration of from about 10 to 80 g/l and preferably 20 to 40 g/l,
b) adding about 0.8 to 1.0 and preferably 0.85 to 0.95 equivalent of an alkaline precipitant to said aqueous iron(II) sulfate solution to precipitate a suspension of iron(II) hydroxide or iron(II) carbonate, and
c) oxidizing the iron(II) hydroxide or iron(II) carbonate by intensively aerating said suspension with an oxygen-containing gas to form a suspension of iron(III) oxide hydroxide of the α-FeOOH modification.

Iron(II) salts from steel pickling plants and/or from the production of titanium dioxide may be used with particular advantage for the preparation of the iron(II) sulfate solution.

The temperature prevailing during seed formation is preferably in the range from 15° to 40° C. and, more preferably, in the range from 20° to 35° C.

A suspension of iron(II) hydroxide or carbonate is precipitated by addition of 0.8 to 1.0 equivalent and preferably 0.85 to 0.95 equivalent, NaOH, Na$_2$CO$_3$, NH$_3$, MgO and/or MgCO$_3$ preferably being used.

Precipitation is followed by oxidation preferably using air as the oxidizing agent. To this end, 20 to 300 liters air per hour and per liter suspension are introduced.

The seed suspension may then be advantageously subjected to ripening for 1 to 4 hours at 70° to 100° C.

A yellow seed suspension is obtained which, according to x-ray (or radiographic) phase analysis (Siemens D-500), consists solely of goethite (alpha-FeOOH) (ASTM No. 29.0713).

A quantity of seeds of 4 to 30 g/l, calculated as Fe$_2$O$_3$, is preferably used for pigment formation, a quantity of 7 to 20 g/l being particularly preferred.

Pigment formation may advantageously be carried out by two methods. In the first method, metallic iron and iron(II) salt solution are added to the seed suspension which is then heated to 70° to 100° C. and preferably to 75° to 90° C. and oxidized by aerating the suspension with from about 0.2 to 50 l air per hour and per liter suspension until the required color tone is obtained. This is the case after seed multiplication by a factor of 3 to 15 and preferably 4 to 10.

In the second method, the seed suspension is heated to 70° to 100° C. and preferably to 75° to 90° C. iron(II) salt solution and an alkali solution are then added and the suspension is oxidized by aerating the suspension with from about 1 to 400 l air per hour and per liter suspension until the required color tone is obtained, the pH value being in the range from 4 to 5. The required color tone is again obtained after seed multiplication by a factor of 3 to 15 and preferably 4 to 10.

The salt liquor can be removed by filtration and washing or by sedimentation. The red paste may be processed to slurries or dried and ground to form a powder-form pigment.

Soft pure-colored iron oxide pigments are obtained. α-Fe$_2$O$_3$ is detected by x-ray phase analysis (ASTM No. 33.0664).

To test the pigments for applications in building materials (DIN 53 237), pressings were produced from heavy spar. To this end, 0.5 g pigment and 10 g heavy spar were introduced into an approx. 250 ml glass shaking flask. After addition of 200 steel balls 5 mm in diameter, the contents of the flask were shaken for 3 minutes by means of an automatic table vibrator. The mixture was compressed to form a cylinder.

The color testing of the pigments for applications in the paint field was carried out in Alkydal L64 (a product of Bayer AG, an alkyd resin containing 63% linseed oil and 23% phthalic anhydride to which 5% Luvotix HT (a product of Lehmann & Voss) is added to increase viscosity). The pigment volume concentration is 10%.

The CIELAB data (DIN 6174) were determined using a color measuring instrument with an Ulbricht ball (lighting conditions d/8°, standard light type C/2°); the surface reflection was included.

Tables 1 and 2 show the colorimetric data of a few pigments according to the invention and, for comparison, the corresponding data of a few commercial products.

The color saturation (C*) is a measure of the color purity of the pigments.

In the building materials test, the pigments according to the invention have higher color saturations than the hitherto known direct red pigments (Bayferrox 510 ® produced in accordance with U.S. Pat. No. 3,946,103 or Pfizer Croma Red RO 3097 ®) and the red pigments obtained by calcination of black pigments (produced, for example, in accordance with DE-A 463 773) (Bayferrox 110 ®).

In building materials applications, the aesthetic brick red tones required are obtained through the pronounced yellow tinge (b*) coupled with the high red component (a*).

The present invention also relates to the use of the iron oxide red pigments produced in accordance with the invention for pigmenting lacquers, plastics, building materials and ceramics both as powder-form pigments and in the form of pastes and slurries.

The following Examples, which are intended to illustrate the invention without limiting it in any way, describe the formation of the yellow seed suspension and the synthesis of the red pigment according to the invention.

EXAMPLE 1

22.3 l of an iron sulfate solution from the production of titanium dioxide (concentration 25 g/l $FeSO_4$) are initially introduced. The temperature is 31°0 C. 1,325 l of a 4.75N NaOH solution are added and the suspension is subsequently oxidized for 28 minutes with 52 l air per hour and per liter suspension. The yellow seed suspension obtained is heated to 80° C. and stirred for 2 hours.

EXAMPLE 2

44 $m^3$ of an iron sulfate solution from the production of titanium dioxide (concentration 24.6 g/l $FeSO_4$) are initially introduced. The temperature is 29° C. 2.85 $m^3$ of a 4.5N NaOH solution are added and the suspension is subsequently oxidized for 30 minutes with 215 l air per hour and per liter suspension. The yellow seed suspension obtained is heated to 80° C. and stirred for 2 hours.

EXAMPLE 3

126 ml iron(II) sulfate solution (200 g/l $FeSO_4$), 1603 ml water and 450 g metallic iron are added to 3271 ml of the seed suspension produced in accordance with Example 1. After heating to 85° C., the suspension is oxidized with 20 l air per hour and per liter suspension. After 40 hours, the yellow seed suspension has been converted into a pure-colored red pigment. The multiplication factor is 9.6. The suspension is filtered, washed free from salts, dried at 85 ° C. and the pigment obtained is ground.

EXAMPLE 4

336 ml iron(II) sulfate solution (200 g/l $FeSO_4$), 6664 ml water and 1600 g metallic iron are added to 14,000 ml of the seed suspension prepared in accordance with Example 2. After heating to 85° C., the suspension is oxidized with 0.5 l air per hour and per liter suspension. After 18 hours, the yellow seed suspension has been converted into a pure-colored red pigment. The multiplication factor is 3.7. The suspension is filtered, washed free from salts, dried at 85° C. and the pigment obtained is ground.

EXAMPLE 5

The procedure is as in Example 4. After 22 hours and seed multiplication by a factor of 4.6, the suspension is filtered, washed free from salts, dried at 85° C. and the pigment obtained is ground.

EXAMPLE 6

126 ml iron(II) sulfate solution (200 g/l $FeSO_4$), 1603 ml water and 450 g metallic iron are added to 3271 ml of the seed suspension produced in accordance with Example 1. After heating to 85° C., the suspension is oxidized with 20 l air per hour and per liter suspension. After 40 hours, the yellow seed suspension has been converted into a pure-colored red pigment. The multiplication factor is 11.5. The suspension is filtered, washed free from salts, dried at 85° C. and the pigment obtained is ground.

EXAMPLE 7

336 ml iron(II) sulfate solution (200 g/l $FeSO_4$), 6664 ml water and 1600 g metallic iron are added to 14,000 ml of the seed suspension prepared in accordance with Example 2. After heating to 85° C. the suspension is oxidized with 0.5 l air per hour and per liter suspension. After 22 hours, the yellow seed suspension has been converted into a pure-colored red pigment. The multiplication factor is 4.4. The suspension is filtered, washed free from salts, dried at 85° C. and the pigment obtained is ground.

TABLE 1

Colorimetric data of iron oxide red pigments
Testing in heavy spar (building materials applications)

| Pigment | L* | a* | b* | C* | Remarks |
|---|---|---|---|---|---|
| Pfizer Croma Red RO 3097 ®[1] | 51.0 | 28.8 | 22.8 | 36.7 | Direct Red |
| Bayferrox 510 ®[2] | 52.9 | 31.2 | 32.2 | 44.8 | Direct red acc. to US-A-3,946,103 |
| Bayferrox 110 ®[2] | 52.5 | 30.6 | 26.9 | 40.7 | Calcined black iron oxide |
| Example 3 | 54.6 | 32.1 | 34.8 | 47.3 | |
| Example 4 | 57.9 | 30.0 | 35.9 | 46.8 | |
| Example 5 | 54.5 | 33.1 | 31.6 | 45.8 | |

[1] A product of Pfizer
[2] A product of Bayer AG

TABLE 2

Colorimetric data of iron oxide red pigments
Pure tone testing in Alkydal ® L64 (lacquer applications)

| Pigment | L* | a* | b* | C* | Remarks |
|---|---|---|---|---|---|
| Pfizer Croma Red RO 3097 ®[1] | 39.6 | 28.5 | 22.2 | 36.1 | Direct Red |
| Bayferrox 510 ®[2] | 40.9 | 28.5 | 23.9 | 37.2 | Direct red acc. to US-A-3,946,103 |
| Bayferrox 105M ®[2] | 41.3 | 29.1 | 24.4 | 38 | Calcined black iron oxide |
| Example 6 | 41.6 | 29.6 | 25.2 | 38.9 | |
| Example 7 | 42.3 | 29.6 | 26 | 39.4 | |

[1] A product of Pfizer
[2] A product of Bayer AG

What is claimed is:

1. Iron oxide direct red pigments having a color saturation in the building materials test of more than 45 CIELAB units and/or a color saturation in the lacquer test of more than 37.5 CIELAB units.

2. Iron oxide direct red pigments as claimed in claim 1, wherein, in the building materials test, the red component (a*) is more than 28 CIELAB units and the yellow component (b*) is more than 29 CIELAB units.

3. A process for the production of the pure-colored iron oxide red pigments claimed in claim 1, comprising addition of iron (II) salt solution and metallic iron or iron(II) salt solution and an alkali solution to a seed suspension and oxidation with oxygen-containing gases until the required color tone is obtained, wherein a yellow goethite seed suspension consisting essentially of stellately branched particles having a specific surface of greater than 100 $m^2/g$ and an average particle size of less than 0.2 μm is used as the seed suspension for synthesis of the pigment.

4. A process as claimed in claim 3, wherein the seed suspension is prepared by
 a) forming an aqueous iron(II) sulfate solution having a concentration of from about 10 to 80 g/l;

b) adding about 0.8 to 1.0 equivalent of an alkaline precipitant to said aqueous iron(II) sulfate solution to precipitate a suspension of iron(II) hydroxide or iron(II) carbonate; and c) oxidizing said iron(II) hydroxide or iron(II) carbonate by intensively aerating said suspension with an oxygen-containing gas to form said seed suspension.

5. A process as claimed in claim 4, wherein the precipitation and oxidation steps are carried out at a temperature of from about 15° to 40° C.

6. A process as claimed in claim 4, wherein the precipitant comprises at least one substance selected from the group consisting of NaOH, $Na_2CO_3$, $NH_3$, MgO and $MgCO_3$.

7. A process as claimed in claim 4, wherein the seed suspension is ripened for 1 to 4 hours at a temperature of from about 70° to 100° C.

8. A process as claimed in claim 3, wherein the concentration of seeds in the seed suspension is from about 4 to 30 g/l.

9. A process as claimed in claim 3, wherein metallic iron and iron(II) salt solution are added to the seed suspension, the suspension is then heated to a temperature of from about 70° to 100° C. and is then oxidized by aerating the suspension with from about 0.2 to 50 l air per hour and per liter suspension until the required color tone is obtained.

10. A process as claimed in claim 3, wherein the seed suspension is heated to a temperature of from about 70° to 100° C., iron(II) salt solution and alkali solution are then added and the suspension is then oxidized by aerating the suspension with from about 1 to 400 l air per hour and per liter suspension until the required color tone is obtained.

11. A process as claimed in claim 4, wherein the aqueous iron(II) sulfate solution has a concentration of from about 20 to 40 g/l.

12. A process as claimed in claim 4, wherein about 0.85 to 0.95 equivalent of the alkaline precipitant is added in step b).

13. A process as claimed in claim 5, wherein the precipitation and oxidation steps are carried out at a temperature of from about 20° to 35° C.

14. A process as claimed in claim 8, wherein the concentration of seeds in the seed suspension is from about 7 to 20 g/l.

15. A process as claimed in claim 9, wherein the suspension is heated to a temperature of from about 75° to 90° C.

16. A process as claimed in claim 10, wherein the suspension is heated to a temperature of from about 75° to 90° C.

17. A process as claimed in claim 4, wherein the oxygen-containing gas is air.

18. A process as claimed in claim 17, wherein said air is introduced to said suspension of iron(II) hydroxide or iron(II) carbonate in a quantity of from about 20 to 300 liters of air per hour and per liter of said suspension.

19. Building materials, ceramics, lacquers or plastics containing the iron oxide direct red pigments claimed in claim 1.

20. Iron oxide direct red pigments as claimed in claim 1 wherein, in the lacquer test, the red component (a*) is more than 27.5 CIELAB units and the yellow component (b*) is more than 23 CIELAB units.

* * * * *